Oct. 3, 1967 K. RÄNTSCH 3,344,701
INTERFERENTIAL LENGTH MEASUREMENT DEVICE
Filed July 28, 1964 3 Sheets-Sheet 1

INVENTOR:
Kurt Räntsch,
BY Singer, Stern & Carlberg
Attorneys.

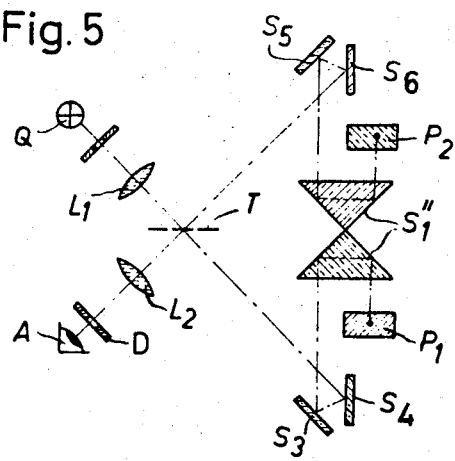
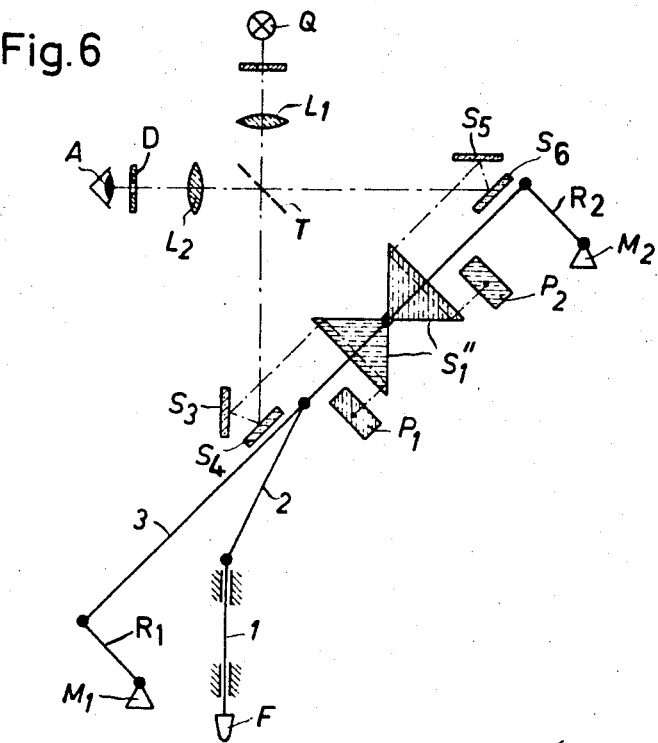

United States Patent Office 3,344,701
Patented Oct. 3, 1967

3,344,701
INTERFERENTIAL LENGTH MEASUREMENT DEVICE
Kurt Räntsch, Heidenheim (Brenz), Germany, assignor to Carl Zeiss-Stiftung, doing business as Carl Zeiss, Heidenheim (Brenz), Wurttemberg, Germany, a corporation of Germany
Filed July 28, 1964, Ser. No. 385,673
Claims priority, application Germany, Aug. 3, 1963, Z 10,271
4 Claims. (Cl. 88—14)

ABSTRACT OF THE DISCLOSURE

In abstract form, the invention provides an interferential length measuring device having a measuring light source of a predetermined wavelength, and a triangulation reduction linkage connected between the movable mirror of said measuring device and a scanning device to reduce the conversion factor establishing the relationship between the number of interference fringes displaced and the actual distance the scanning device is moved by a test object to a reasonable convenient figure which can be used to facilitate computations with ease and without requiring unnecessary time.

---

The invention relates to an intereferential length measuring device in which two coherent beams of light are produced by means of a beam splitter and two reflectors and these beams of light are brought to interference with one another. In such measuring devices the measurement is effected in that one of the reflectors is dsplaced in the direction of the incoming and reflected light beam by the amount of the distance to be measured, and in that in a microscopic arrangement the number of the intereference bands is ascertained which pass through a reticle during the mentioned displacement operation. The distance between each two adjacent interference bands amounts to one half wavelength of the measuring light which is employed.

This method of light measuring is relatively inconvenient for the reason that the measured wavelengths of the available monochromatic light sources are expressed in terms of the metric decimal system and do not constitute fairly even numbers which would permit an easy translation of the determined number of interference bands into the length value wanted. A simple example may illustrate the situation: The red cadmium line, for instance, has a wavelength of 0.6438 mu. In a conventional measuring device in which a succession of interference bands with a band distance of one half wavelength each is produced, the number of the interference bands counted during the measuring operation would have to be multiplied with the inconvenient number of 0.3219. It is therefore desirable— and this is the object of the present invention—to replace the value of the distance between the interference bands by an approximate mathematical value which is a tolerably even number. This would make it possible to use an exact scale on the measuring device which would indicate the number of interference bands which have passed the mark in the measuring ocular as well as their corresponding length values in metric terms.

In accordance with the invention, one of the two reflectors, namely the one which is displaceable in the direction of the incident light, is connected with a transmission linkage which converts the displacement of a measurement scanner—which displacement corresponds to the measured value—into an amount which when multiplied by an even number produces the desired length value. The arrangement is such that the distance displacement of the movable reflector is measured by the number of interference bands travelling through the measuring ocular of the device during the displacement operation.

If the red cadmium line having a wavelength of 0.3219 mu is employed as a monochromatic source of light, a conversion to the factor 0.300 would be desirable, but in general a reduction to 0.320 will already suffice. Then simpler transmission linkages will do the job.

Controlling for the desired conversion of numbers is the angle formed between the end lever of the transmission linkage which acts upon the movable reflector and the direction of movement of the measurement scanner. This angle in accordance with the invention has to correspond to the relation $$\cos \varphi = \frac{v}{s} = \frac{\lambda'}{\lambda}$$

$v$ is the extent of movement of the measurement scanner and $s$ of the movable reflector (both measured e.g. in $10^{-6}$ inch). The magnitude of $\cos \varphi$ thus constitutes the transmission ratio of the linkage and this is equal to the proportion of the substitute even approximate number $\lambda'$ to the true value of the wavelength $\lambda$.

In an interferential length measuring device it is possible, depending upon the number of reflections to which the two coherent light beams within the device are subjected, to have the movement of interference bands in the ocular by one band distance correspond to a displacement of the movable reflector not of one half wavelength, but also by one quarter wavelength, or by any other smaller even-numbered fraction of one half wavelength.

The invention will now be described in more detail with reference to the accompanying drawings in which FIG. 1 is a diagrammatic view of a simple interferential measuring device of conventional construction;

FIG. 5 illustrates a modification of the device shown in FIG. 4 in which a double reflecting square is employed as a movable reflector;

FIG. 6 illustrates diagrammatically the combination of the device of FIG. 5 with the transmission linkage of the invention.

Figure 1:
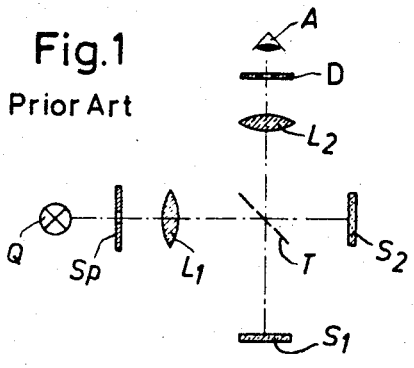

Referring to FIG. 1, which illustrates a conventional interferential length measuring device, the light beam passing from the source of light Q through a slit $Sp$ is directed parallel by the collective lens $L_1$ and then impinges upon a partly tranmissive beam splitter T which splits the beam and deflects a part of it to the reflector $S_1$. The reflector $S_1$ reflects the partial light beam back to the beam splitter T, the light beam penetrates the same and passes on to the collective lens $L_2$ and through a diaphragm D arranged in front of the exit pupil, and then reaches the eye A of the observer.

The portion of the light beam not deflected by the beam splitter T passes straight through the same and impinges upon the reflectors $S_2$ which returns part of the light beam to the beam splitter T from where it is reflected also toward the collective lens $L_2$ and into the observing eye A. The visible interference bands whose spacing is directly dependent upon the wavelength of the monochromatic light of the light source Q used, travel in the viewing area of the instrument when the reflector $S_1$ is slidably displayed by the distance to be measured in the direction of the entering and leaving light beam. The number of the interference bands travelling during this displacement through a reticle in the ocular multiplied by one half wavelength of the measuring light produces the desired measuring value.

Figure 2:
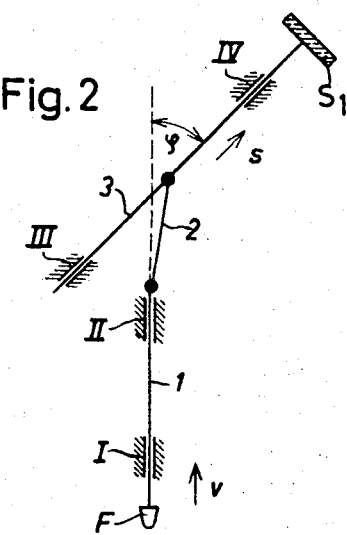
FIG. 2 illustrates diagrammatically a transmission linkage in accordance with the invention.

FIG. 2 illustrates diagrammatically a transmission linkage consisting of three rods 1, 2 and 3 which are pivotally connected with each other. The rod 1 is connected at one of its ends with a measuring scanner F which lies close to the object to be measured and which is displaced during the measurement a distance which is equal to the value to be determined. The upper end of the rod 3 is connected to the mirror $S_1$ of FIGURE 1 and the remaining assembly in FIGURE 1 can be oriented slightly so that the mirror $S_1$ in FIGURE 1 will assume the position of the mirror $S_1$ in FIGURE 2. The rod 1 is movable lengthwise and is guided in two axially spaced bearings I and II and is actuated by the rod 2 which is pivotally connected with its lower end to the upper end of the rod 1. The end rod 3 is pivotally connected between its ends with the upper end of the rod 2 and is lengthwise movable and guided by two axially spaced bearings III, IV so that the longitudinal axis of the rod 3 forms an angle $\varphi$ with the longitudinal axis of the rod 1. The cosinus of this angle $\varphi$ constitutes the transmission ratio $v/s$ of this transmission linkage and is equal to the quotient of the rounded off or even number $\lambda'$ and the true value $\lambda$ of the wavelength of the measured light. This means for the measurement operation that the reflector $S_1$ is not displaced a distance equal to the length $v$ to be measured, but is displaced a reduced distance $$s = v \cdot \frac{1}{\cos \varphi}$$

It means also that in the ocular are not counted $n$ interference bands (with a spacing of $\lambda/2$), as heretofore, but a different number $n'$ which is to be multiplied not by $\lambda/2$ but by the rounded off number $\lambda'/2$. In the example of the red cadmium line, for $\lambda'/2$ would have to be inserted the number 0.30 or 0.32.

Figure 3:
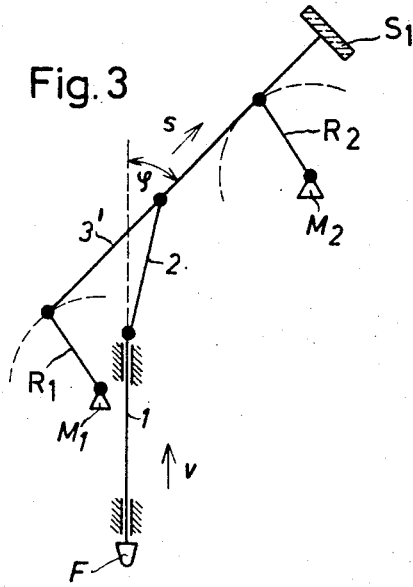
FIG. 3 illustrates a modified transmission linkage with other guide elements.

In the embodiment of the transmission linkage illustrated in FIG. 3, it will be seen that the end rod 3' is not axially slidably adjustable but has its two ends pivotally connected to the two free ends of parallel radial levers $R_1$ and $R_2$ which are synchronously swingable about two spaced stationary pivots $M_1$ and $M_2$, respectively. This embodiment 1, 2, 3', $R_1$, $R_2$ remains constant even when more substantial slidable displacement take place.

When the conversion of the wavelength value into a convenient number results in two great a value for the angle $\varphi$, then it is possible by a suitable modification of the interferometer to work with even-numbered fractions of one half wavelength as a measure for the slidable displacement of the adjustable reflector.

Figure 4:
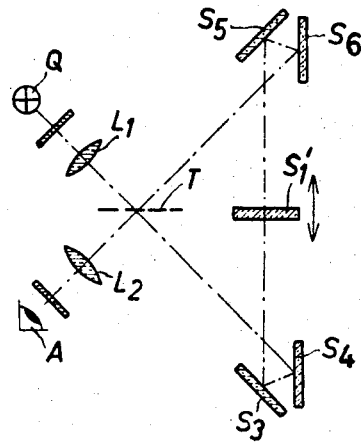
FIG. 4 illustrates diagrammatically a length measuring device in which a simple double mirror is employed as a movable reflector.

FIG. 4 illustrates diagrammatically the arrangement of an interferometer in which the slidable displacement of the reflector $S_1$—during which displacement a dislocation of interference bands by one distance width is observed in the ocular—amounts to only ¼ wavelength. For this purpose the reflector $S_1$ of the embodiment according to FIG. 1 is replaced by a twin reflector $S_1'$ the plane faces of which are coated with a reflective layer and which in the zero position of the device is arranged at equal light distance from the beam splitter of the device. Furthermore, there are arranged in the light paths additional reflectors $S_3$, $S_4$, $S_5$ and $S_6$, so that every beam of light sent forth by the beam splitter T is subjected on its way and way back to a total of five reflections.

Figure 7:
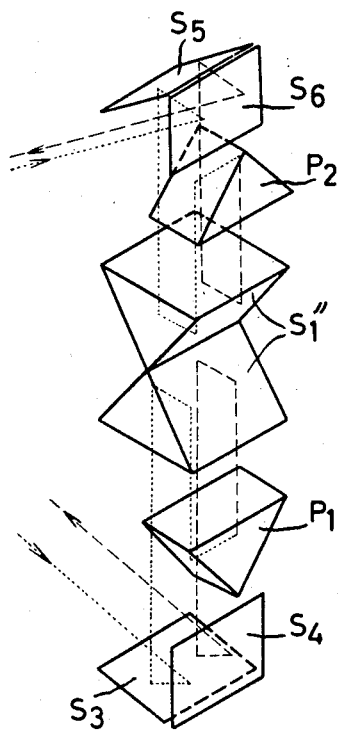
FIG. 7 illustrates perspectively a part of the devices shown in FIG. 5 and FIG. 6.

FIG. 5 shows diagrammatically in interferometer arrangement in which the slidable displacement of interference bands as observed in the ocular at a distance equal to the space between two interference bands corresponds to a slidable displacement of the reflector of only ⅛ of the wavelength of the measured light. The twin mirror $S_1'$ of the embodiment of FIG. 4 is replaced by a double reflecting square $S_1''$ which reflects the beams of light four times on each way, which means eight reflections altogether. This double reflecting square $S_1''$ is slidably displaceable by the scanner and is arranged between two fixed roof edge prisms $P_1$ and $P_2$ by which the light beams coming from the reflecting square $S_1''$ are thrown back to the latter parallel to their direction of emergence (see FIG. 7). Again, between the reflecting square $S_1''$ and the beam splitter T, there are arranged two additional pairs of reflectors $S_3$, $S_4$ and $S_5$, $S_6$. The total number of reflections to which in this case the coherent light beams in the device are subjected after having been split by the beam splitter therefore amounts to ten.

FIG. 6 illustrates diagrammatically a complete measuring device provided with a double reflecting square $S_1''$ in connecting with the transmission linkage 1, 2, 3, $R_1$, $R_2$ according to the invention. The light emitted by the source of light Q and directed parallel by the collective lens $L_1$ is plit by the beam splitter T in two coherent beams of light which by the pairs of mirrors $S_3$, $S_4$ and $S_5$, $S_6$ arranged at opposite sides are conducted to the double reflecting square $S_1''$. Upon being reflected twice by this reflecting square $S_1''$ the light beams are reflected parallel to their own direction back to the double reflecting square $S_1''$ by the stationary roof edge prisms $P_1$ and $P_2$ from where they pass on to the two mirror pairs $S_4$, $S_3$ and $S_6$, $S_5$ and are reflected by the same either directly or over the beam splitter T under the formation of interferences into the ocular $L_2$ and from there into the observer's eye A. The scanner F transmits its motion over the rod linkage 1–2–3 to the double reflecting square $S_1''$ whose slidable displacement by ⅛ of the wavelength causes a travelling of the interference bands by one interval which is observed in the ocular $L_2$. The end rod 3 of the transmission linkage is pivotally mounted on the two spaced parallel radial levers $R_1$ and $R_2$ (FIG. 3) which are synchronously swingable about the fixed pivots $M_1$ and $M_2$, so that a constant transmission ratio over long displacement distances is achieved by the transmission gearing.

What I claim is:

1. Interferential length measuring device including a measuring light of a predetermined wavelength with a beam splitter providing two separate light beam paths, a fixed reflector arranged in th path of one of said light beams and a movable reflector arranged in the path of said other light beam, a measuring scanner, and a movement transmitting linkage for reducing movement by triangulation connecting said scanner with said movable reflector, said movement transmitting linkage including two rods of which one is longitudinally movable and is pivotally connected between its ends with one end of said other rod, the other end of which is pivotally connected with said measuring scanner, said first rod which is longitudinally movable forming with the direction of movement of said measuring scanner an angle $\varphi$ which complies with the relation $$\cos \varphi = \frac{\lambda'}{\lambda}$$

wherein $\lambda$ is the wavelength of the measuring light and $\lambda'$ is a rounded off number close to the wavelength of said measuring light, whereby the conversion factor with respect to the relationship between the number of interference bands displaced and the distance actually moved by a test object will be reduced to a reasonably convenient numeral amount.

2. Interferential length measuring device including a measuring light of a predetermined wavelength with a beam splitter providing two separate light beam paths, a fixed reflector arranged in the path of one of said light beams and a movable reflector arranged in the path of said other light beam, a measuring scanner, and a movement transmitting linkage for reducing movement by triangulation connecting said scanner with said movable reflector, said movement transmitting linkage including two rods of which one is longitudinally movable and is pivotally connected between its ends with one end of said other rod, the other end of which is connected with said measuring scanner, said first rod which is longitudinally movable is pivotally connected adjacent its end to the free ends of two parallel levers which are moved simultaneously with their other ends about fixed pivots, said first rod forming with the direction of movement of said measuring scanner an angle $\varphi$ which complies with the relation $$\cos \varphi = \frac{\lambda'}{\lambda}$$

wherein $\lambda$ is the wavelength of the measuring light and $\lambda'$ is a rounded off number close to the wavelength of said measuring light, whereby the conversion factor with respect to the relationship between the number of interference bands displaced and the distance actually moved by a test object will be reduced to a reasonably convenient numeral amount.

3. Interferential length measuring device including a measuring light of a predetermined wavelength with a beam splitter providing two separate light beam paths, a fixed reflector arranged in the path of one of said light beams and a movable reflector arranged in the path of said other light beam, a measuring scanner, and a movement transmitting linkage for reducing movement by triangulation connecting said scanner with said movable reflector, said movement transmitting linkage including two rods of which one is longitudinally movable and is pivotally connected between its ends with one end of said other rod, the other end of which is pivotally connected with said measuring scanner, said first rod which is longitudinally movable forming with the direction of movement of said measuring scanner an angle $\varphi$ which complies with the relation $$\cos \varphi = \frac{\lambda'}{\lambda}$$

wherein $\lambda$ is the wavelength of the measuring light and $\lambda'$ is a rounded off number close to the wavelength of said measuring light, said movable reflector comprising a plane parallel body provided on both plane faces with a reflective layer, said faces of said body being arranged in the zero position of said body uniformly spaced each from two additional mirrors arranged in the paths of the light beams of said beam splitter, whereby the conversion factor with respect to the relationship between the number of interference bands displaced and the distance actually moved by a test object will be reduced to a reasonably convenient numeral amount.

4. Interferential length measuring device including a measuring light of a predetermined wavelength with a beam splitter providing two separate light beam paths, a fixed reflector arranged in the path of one of said light beams and a movable reflector arranged in the path of said other light beam, a measuring scanner, and a movement transmitting linkage for reducing movement by triangulation connecting said scanner with said movable reflector, said movement transmitting linkage including two rods of which one is longitudinally movable and is pivotally connected between its ends with one end of said other rod, the other end of which is pivotally connected with said measuring scanner, said first rod which is longitudinally movable forming with the direction of movement of said measuring scanner an angle $\varphi$ which complies with the relation $$\cos \varphi = \frac{\lambda'}{\lambda}$$

wherein $\lambda$ is the wavelength of the measuring light and $\lambda'$ is a rounded off number close to the wavelength of said measuring light, said movable reflector comprising a double reflecting square arranged between two fixedly mounted roof edge prisms and including two additional mirrors for each said double reflecting square arranged in the light paths of the coherent beams of light, whereby the conversion factor with respect to the relationship between the number of interference bands displaced and the distance actually moved by a test object will be reduced to a reasonably convenient numeral amount.

References Cited

UNITED STATES PATENTS

| | | | |
|---|---|---|---|
| 2,583,596 | 1/1952 | Root | 88—14 |
| 2,734,419 | 2/1956 | Hendrix | 88—14 |
| 2,947,473 | 8/1960 | Silverburg et al. | 235—61 |

FOREIGN PATENTS 1,030,059  5/1958  Germany.

OTHER REFERENCES

Reuleau: Kinematics of Machinery, 1876, MacMillan & Co., p. 339, tJ 175 R4te.

JEWELL H. PEDERSEN, *Primary Examiner.*

B. LACOMIS, *Assistant Examiner.*